Dec. 9, 1924.

M. MERRITT

TRAP NEST

Filed Oct. 31, 1923

1,518,343

INVENTOR.

BY

ATTORNEYS.

Patented Dec. 9, 1924.

1,518,343

UNITED STATES PATENT OFFICE.

MERTON MERRITT, OF SYRACUSE, NEW YORK.

TRAP NEST.

Application filed October 31, 1923. Serial No. 672,001.

*To all whom it may concern:*

Be it known that I, MERTON MERRITT, a citizen of the United States, and a resident of Syracuse, in the county of Onondaga and State of New York, have invented a certain new and useful Trap Nest, of which the following is a specification.

This invention relates to a trap nest of the type disclosed in my Patent No. 1,464,850, issued August 14, 1923, and has for its object a particularly simple and efficient means for supporting the collar of my Patent No. 1,464,850 and of releasing same when the hen leaves the nest.

The invention consists in the novel features and in the combinations and constructions hereinafter set forth and claimed.

In describing this invention, reference is had to the accompanying drawings in which like characters designate corresponding parts in all the views.

Figure 1:
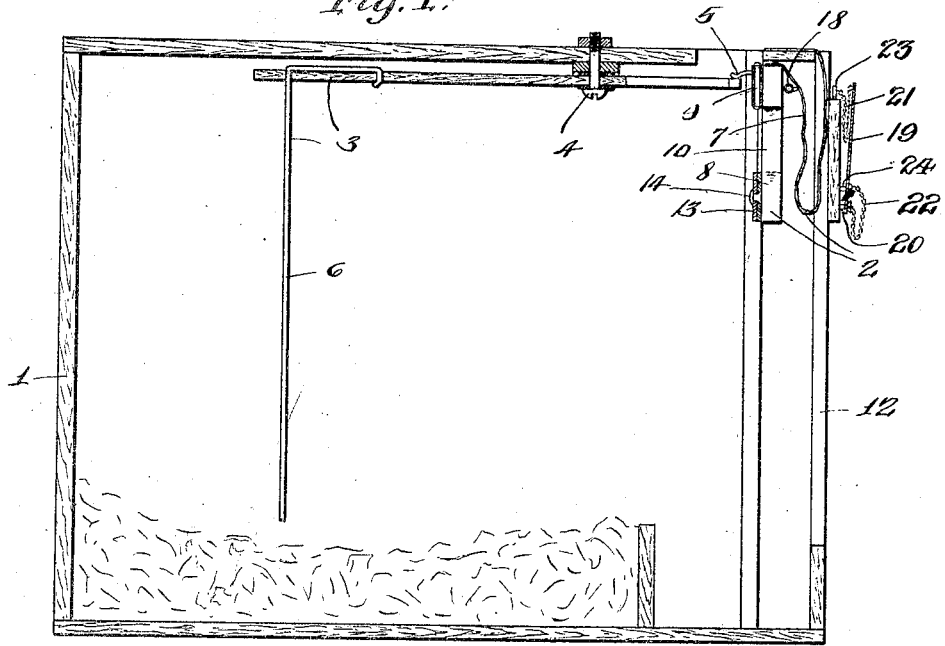
Figure 1 is a vertical, sectional view of the trap nest embodying my invention.
Figures 2, 3, 4:
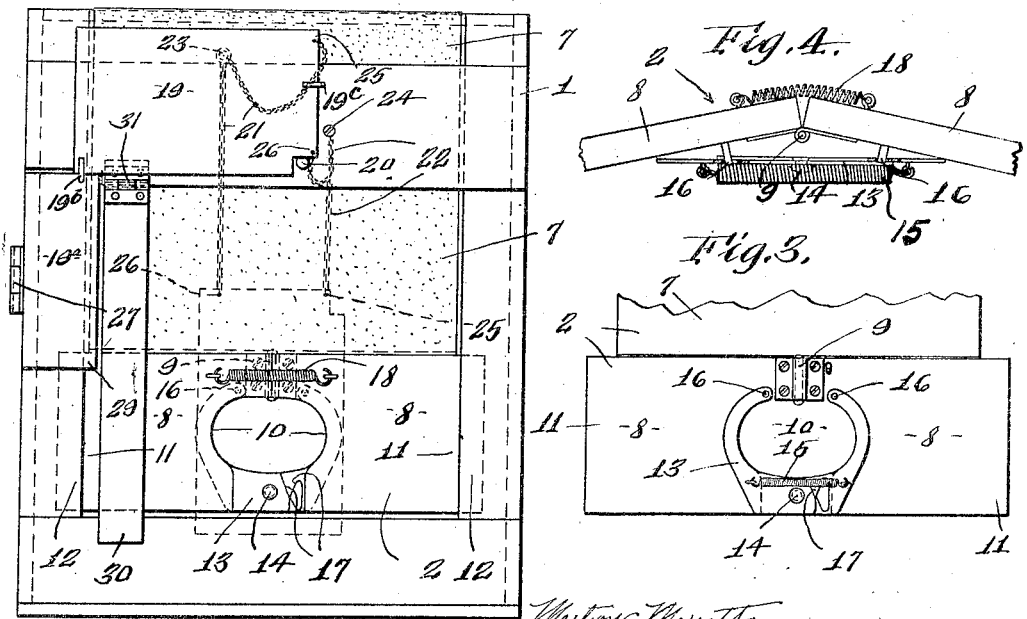
Figure 2 is a front elevation thereof.
Figure 3 is a fragmentary rear elevation of the gate.
Figure 4 is a diagrammatic view illustrating the operation of the gate when releasing the tag onto the neck of the hen leaving the nest.

This trap nest comprises a box having a gate, gate mechanism for normally holding the gate open and arranged to be tripped by the hen when entering the nest to permit the gate to move to closed position, the gate comprising two sections foldably secured or hinged together about an upright axis and having cutouts in their hinged edges which also open through the lower edges of said sections forming a passage through which the hen pokes her head and neck when leaving the nest, the sections being arranged to bow outwardly and means for supporting a tag in the form of a split collar in alinement with such passage and releasing same, such tag being constructed to close when not held open, so that the collar closes about the neck of the hen leaving the nest when the sections have been folded or bowed outwardly, a predetermined amount by the hen as she leaves the nest.

1 designates a box which may be of any suitable form, size and construction. 2 is a gate usually mounted to slide vertically in the front of the box to close the entrance to the box and 3 designates a trip mechanism for normally holding the gate elevated, this mechanism being here shown as comprising a lever pivoted at 4 between its ends to the top of the box to swing horizontally and having one end caught under a pin or lug 5 projecting from the rear side of the gate 2 and having its other end provided with a trigger 6 arranged to be engaged by the hen after she has entered the nest far enough to permit the gate to close. The trip mechanism may be of any suitable form, size and construction and forms no part of this invention.

The gate 2, as here illustrated, comprises a curtain 7 secured to the top of the box, rigid sections 8 secured to the lower edge of the curtain, these sections being hinged together at 9 to swing outwardly about an upright axis, said sections being provided with cutouts in their meeting or hinged edges which open through the lower edges of the sections, these cutouts forming a passage 10 through which the hen pokes her head and neck when leaving the nest. The pin 5 with which the trip mechanism coacts is provided on the upper edge of one of these sections 8. The outer or lateral margins 11 of the sections 8 are normally caught behind the uprights 12 at the sides of the entrance of the box, such uprights constituting means for folding the lateral ends of the sections until the sections have been bowed outwardly far enough to release the tag.

13 designates a tag or split collar which is substantially of the same construction as that shown in my Patent No. 1,464,850, this tag comprising two sections which are hinged together at 14 and are pulled toward each other by a spring 15. The sections 8 are provided with means as latches or pins 16 on opposite sides of its axis 9 for engaging the ends of the sections of the collar 13 and holding the sections separated against the action of the spring 15, these pins 16 projecting rearwardly from the sections 8, so that the tag is arranged on the inner or rear side of the sections 8. These pins are arranged to support the collar with the pivoted ends thereof extending across the portion of the passage 10 opening through the lower edge of the sections 8, so that, when the tag is mounted on the gate, the passage presented to the hen to poke her head through is a round hole.

In operation, the hen, on entering the nest, engages the trigger 6 to actuate the trap mechanism and permit the gate 2 to close by gravity, so that the sections 8, descend toward the bottom of the nest and the entrance is closed save for the passage 10. The hen, on leaving the nest, pokes her head through the collar and the passage 10 and, in pushing against the collar, causes the sections 8 to fold outwardly about their axis 9 and these sections, in so folding, draw in their outer margins 11 from behind the uprights 12, so that the gate can swing outwardly far enough to permit the hen to leave the nest.

During the outward folding of the sections 8, the pins 16 move out of engagement with the collar 13 and release it from said pins, so that it is snapped by the spring 15 onto the neck of the hen. The movement of these arms toward each other is stopped in any suitable manner as by the ends of the collar engaging each other or by the stops 17, that is, the collar has a stop joint. The sections 8, are connected by a suitable spring 18 extending across its line of fold and tending to move the sections into their normal or straight position.

In order to close the passage 10, after the gate 2 has been closed and the hen has left the nest, an additional gate is provided for closing the passage 10, this gate being operated or released by the hen when leaving the nest. 19 designates the additional gate on the box in front of the gate 2 and held in its elevated position by a latch 19ª. The gate 19 is arranged to swing downwardly and laterally in a vertical plane into closed position over the passage 10.

As here shown, the gate normally rests at one end on the latch 19ª and at its other end on a suitable shoulder or pin 20 on the frame or box and, when the latch 19ª is tripped, its outer end will swing downwardly and its inner end off the pin 20. The gate 19 is suspended in its closed position in any suitable manner here shown as light cables or chains 21, 22 fixed at 23 and 24 respectively to the box and at 25 and 26 to the inner or right hand edge of the gate 19 when the gate is in its open position, this inner or right hand edge being the upper edge of the gate 18 when such gate is swung to its closed position. The latch 19ª is formed with an upwardly extending clip 19ᵇ at its upper edge which normally extends in front of the corner of the gate 19, resting on the latch to normally hold the gate 19 from accidental displacement off the latch 19ª, this clip 19ᵇ moving away from the gate 19 when the latch 19ª is pushed outwardly by the opening of the gates 8. Also a similar clip 19ᶜ is secured to the front wall 1 of the box and overlies the edge of the gate 19ª above the pin 20. The clip 19ᶜ cooperates with the clip 19ᵇ to hold the gate 19 from accidental displacement. As the gate 19 falls when the latch is tripped, it moves out from under the clip 19ᶜ.

The latch 19ª is hinged to the box on an upright axis 27 at one side of the box and has a corner extending under the outer corner of the gate 19. This latch is arranged to be swung outwardly by the gate 2 when the gate is pushed open by the hen and has a lower corner 29 lapping one of the sections 8 in order to be actuated thereby.

In order to prevent the tripping of this latch 19ª, when the gate 2 is open, by a hen that partly enters the nest and turns around and leaves the nest, a suitable shield is provided, here shown as a member 30, hinged at 31 to the frame at this front side of the box extending vertically across the front edge of the latch 19ª, this strip overlying the gate 2 when the gate is in its closed position, so that it will be swung outwardly with the gate 2. Obviously, the shield 30 will prevent the tripping of the latch 19ª by the hen when the gate 2 is open.

What I claim is:

1. In combination, a trap nest comprising a box, a gate mounted on the box to swing outwardly, the gate including two sections hinged together on an upright axis, the sections being formed with cutouts in their hinged edges forming a passage for the head and neck of the hen leaving the nest, and a tag comprising a split collar mounted on said sections in alinement with said passage, and constructed to close when not held open, the gate having means for holding the collar in open position and releasing the collar when the hinged portions of the sections are pushed outwardly to move said sections about the axis of the hinge.

2. In combination, a trap nest comprising a box, a gate mounted on the box to swing outwardly, the gate including two sections hinged together on an upright axis, the sections being formed with cutouts in their hinged edges forming a passage for the head and neck of the hen leaving the nest, and a tag comprising a split collar mounted on said sections in alinement with said passage, and constructed to close when not held open, the gate having means for holding the collar in open position and releasing the collar when the hinged sections are pushed outwardly to move said sections about the axis of the hinge, and means for holding the outer lateral ends of the sections until said sections fold about the axis of the hinge.

3. In combination, a trap nest comprising a box, a gate, mechanism for normally holding the gate open and arranged to be tripped by the hen when entering the nest to permit the gate to move to closed position, the gate comprising two sections hinged together on a vertical axis and formed with cutouts in their hinged edges forming a passage for the head and neck of the hen, the sections being arranged to be moved outwardly about their axis, and the gate being mounted to be swung outwardly from closed position by the hen when leaving the nest and a tag comprising a split collar mounted on said sections and constructed to close when not held open, the collar being mounted on the sections in alinement with said passage, the sections having means for supporting the collar in open position and for releasing the same when the sections of the gate are moved on said hinge by the thrust of the hen against the inner side of the gate.

4. In combination, a trap nest comprising a box, a gate mounted to swing outwardly, the gate comprising two sections hinged together on an upright axis, the sections having cutouts in their hinged edges forming a passage for the head and neck of the hen leaving the nest, the sections also having rearwardly extending catches on opposite sides of their upright axis, a tag comprising a split collar constructed to close when not held open and having the ends thereof on the opposite sides of its split normally separated and engaged with said catches, the catches being arranged to release the collar when the sections of the gate are bowed outwardly about the axis of the hinge.

5. In combination, a trap nest comprising a box, a normally open gate, mechanism for normally holding the gate open and arranged to be tripped by the hen when entering the nest to permit the gate to close, the gate comprising a curtain fixed at its upper edge and rigid sections secured to the lower edge of the curtain, the sections being hinged together to fold about an upright axis and being formed with cutouts in their hinged edges and opening through the lower edges of such sections, such cutouts forming a passage for the head and neck of the hen leaving the nest and a tag comprising a split collar mounted on said sections in alinement with the passage and constructed to close when not held open, the sections having catches on the opposite sides of their upright axis for receiving the ends of the split collar and holding the collar open and for releasing such ends, when the sections are being pushed outwardly and moved about the axis of the hinge by the thrust of the hen against the collar and the gate when leaving the nest.

6. In combination, a trap nest comprising a box, a normally open gate, mechanism for normally holding the gate open and arranged to be tripped by the hen when entering the nest to permit the gate to close, the gate comprising a curtain fixed at its upper edge and rigid sections secured to the lower edge of the curtain, the sections being hinged together to fold about an upright axis and being formed with cutouts in their hinged edges and opening through the lower edge of such sections, such cutouts forming a passage for the head and neck of the hen leaving the nest and a tag comprising a split collar mounted on said sections in alinement with the passage and constructed to close when not held open, the sections having catches on the opposite sides of their upright axis for receiving the ends of the split collar and holding the collar open and for releasing such ends, when the sections are being pushed outwardly and moved about the axis of the hinge by the thrust of the hen against the collar and the gate when leaving the nest, a second normally open gate movable vertically into and out of closed position to cover said passage when the first gate is closed, and a latch normally holding the second gate in open position, the latch being arranged to be tripped by the outward swinging of the first gate.

7. In combination, a trap nest comprising a box, a normally open gate, mechanism for normally holding the gate open and arranged to be tripped by the hen when entering the nest to permit the gate to close, the gate comprising a curtain fixed at its upper edge and rigid sections secured to the lower edge of the curtain, the sections being hinged together to fold about an upright axis and being formed with cutouts in their hinged edge and opening through the lower edge of such sections, such cutouts forming a passage for the head and neck of the hen leaving the nest and a tag comprising a split collar mounted on said sections in alinement with the passage and constructed to close when not held open, the sections having catches on the opposite sides of their upright axis for receiving the ends of the split collar and holding the collar open and for releasing such ends, when the sections are being pushed outwardly and moved about the axis of the hinge against the collar and the gate by a hen when leaving the nest, a second normally open gate movable vertically into and out of closed position to cover said passage when the first gate is closed, a latch normally holding the second gate in open position, the latch being arranged to be tripped by the outward swinging of the first gate, and a shield for normally preventing the tripping of such latch when the first gate is open.

In testimony whereof, I have hereunto signed my name, at Syracuse, in the county of Onondaga, and State of New York, this 25th day of October, 1923.

MERTON MERRITT.